United States Patent
Meier et al.

(10) Patent No.: US 7,551,948 B2
(45) Date of Patent: Jun. 23, 2009

(54) UNIFORM POWER SAVE METHOD FOR 802.11E STATIONS

(75) Inventors: Robert C. Meier, Cuyahoga Falls, OH (US); Mark Bilstad, San Jose, CA (US)

(73) Assignee: Cisco Technology, Inc.

( * ) Notice: Subject to any disclaimer, the term of this patent is extended or adjusted under 35 U.S.C. 154(b) by 1048 days.

(21) Appl. No.: 10/626,214

(22) Filed: Jul. 24, 2003

(65) Prior Publication Data

US 2005/0018624 A1    Jan. 27, 2005

(51) Int. Cl.
*H04M 1/00* (2006.01)
(52) U.S. Cl. .................. 455/574; 455/512; 455/513; 455/562.1; 455/453; 455/405
(58) Field of Classification Search .............. 455/574, 455/127.1, 127.5, 343.1, 343.2, 343.5; 713/320; 340/10.33, 34; 726/12; 370/445, 338, 252
See application file for complete search history.

(56) References Cited

U.S. PATENT DOCUMENTS

| | | |
|---|---|---|
| 2002/0193073 A1 | 12/2002 | Fujioka |
| 2003/0076804 A1 | 4/2003 | Sivalingham |
| 2003/0088700 A1 | 5/2003 | Aiken |
| 2003/0161340 A1* | 8/2003 | Sherman ............ 370/445 |
| 2004/0264397 A1 | 12/2004 | Benveniste |
| 2005/0009578 A1* | 1/2005 | Liu .................... 455/574 |
| 2006/0182071 A1* | 8/2006 | Soomro ............. 370/338 |

FOREIGN PATENT DOCUMENTS

| | | |
|---|---|---|
| EP | 1 052 867 | 11/2000 |
| EP | 1 182 846 | 2/2002 |

OTHER PUBLICATIONS

U.S. Appl. No. 60/433,604, filed Dec. 16, 2002, Benveniste.
U.S. Appl. No. 60/441,160, filed Jan. 21, 2003, Benveniste.

(Continued)

*Primary Examiner*—Charles N Appiah
*Assistant Examiner*—Randy Peaches
(74) *Attorney, Agent, or Firm*—Tucker Ellis & West LLP

(57) ABSTRACT

A power-save QSTA notifies an Access Point (AP) that its operating in a automatic power-save delivery (APSD) mode and negotiates a periodic wakeup schedule and a scheduled startup time with the AP. Wakeup times are synchronized with the 802.11 Timer Synchronization Function (TSF). The AP automatically sends frames to the QSTA when it determines the QSTA is in an awake state, otherwise downlink frames are buffered. The AP uses a combination poll+EDCF access method wherein at the start of each wakeup period the AP sends a poll to the QSTA, the poll having a flag that indicates to the QSTA if the AP has a downlink fame buffered for the QSTA. In addition, a Proxy ARP Server in an AP maintains IP/MAC bindings for associated clients so that when the AP receives a proxy ARP request for a client, the AP may respond for the client.

86 Claims, 6 Drawing Sheets

OTHER PUBLICATIONS

U.S. Appl. No. 60/497,556, filed Aug. 26, 2003, Benveniste.

Mathilde Benveniste; "Proposed Normative Text for Simplified APSD"; IEEE P802.11; Wireless LANs; Jan. 2003; pp. 1-4.

Draft Supplement to Standard For Telecommunications and Information Exchange Between Systems-LAN/MAN Specific Requirements-Part 11: Wireless Medium Access Control (MAC) and Physical Layer (PHY) Specifications: Medium Access Control (MAC) Enhancements for Quality of Service (QoS); IEEE Std. 802.11e/D4. 3; May 2003.

European Search Report for European Application No. 04 75 5537. XP-002307288, "Part 11: Wireless LAN Medium Access Control (MAC) and Physical Layer (PHY) specifications", IEEE Std 802.11-1997.

* cited by examiner

UNIFORM POWER SAVE METHOD FOR 802.11E STATIONS

CROSS-REFERENCE TO RELATED APPLICATIONS.

This application is related to U.S. application Ser. No. 10/394,780, filed Mar. 21, 2003.

BACKGROUND OF THE INVENTION

The present invention relates generally to wireless communications, and more specifically to power saving methods for wireless devices.

The IEEE 802.11e task group (TGe) is defining enhancements to the base IEEE 802.11 standard for Quality-of-Service (QoS). TGe has recently adopted an 802.11e draft standard that attempts to extend QoS to power-save stations. The current 802.11e power-save methods are not uniform and suffer from the issues which will be discussed below.

An Overview of 802.11e Power-Save Mechanisms:

The current 802.11e draft augments the PS-Poll power save mechanism with two new power-save methods:

1) The Automatic Delivery Power-Save (APSD) method. A Quality of Service wireless station (QSTA) uses the current 802.11e APSD mechanism to establish Wakeup Beacons, where the QSTA automatically transitions to an awake state and the access point (AP automatically delivers buffered downlink frames to the QSTA, following each Wakeup Beacon. The APSD mechanism is an extension of the CF-Pollable power-save mechanism in the base 802.11 standard.

2) The "Service Schedule" method. With the 802.11e Service Schedule method, a QSTA uses traffic specification (TSPEC) signaling to establish QoS service requirements. The Hybrid Coordinator (HC) in the access point (AP) aggregates the TSPEC information and establishes periodic Service Periods for the QSTA by sending a Schedule element to the QSTA. A QSTA must be awake for the start of each Service Period.

In addition, the 802.11 base standard defines a power-save mechanism, however, this power-save mechanism is not considered to be suitable for QoS applications.

The APSD method is very useful for asynchronous applications and applications that are not latency sensitive. However, for applications such as Voice over Internet Protocol (VoIP), APSD has the following concerns:

1) APSD requires a very fast Beacon rate to support a typical VoIP sampling rate;

2) APSD tends to crowd downlink data around Beacons; therefore, QSTAs must often remain awake while frames are transmitted to other QSTAs. It should be noted that 802.11 Beacons contain a Traffic Indication Message(TIM), so that QSTAs can receive both Beacons and downlink data in the same wakeup interval. A QSTA can immediately go back to a Doze (power-save) state if its TIM bit is set OFF; otherwise, it must stay awake to receive downlink frames buffered in the AP.

3) The APSD method adds "latency" to downlink power-save transmissions, because downlink frames are delayed until the next Wakeup Beacon.

The current 802.11e Service Schedule methods has the following concerns:

1) A "Service Period," as defined in the current 802.11e draft, starts with the first successful downlink transmission. If there is not an uplink transmission in each Service Period, then Service Periods can become unsynchronized such that the AP and QSTA disagree on the next Service Period start time. One proposed solution is to require at least one uplink data frame in each Service Period, however, such a solution is not desirable because it adds extra traffic.

2) The timer logic required for Service Period scheduling is complex and different than the timer logic required for the APSD mechanism.

3) The Service Period mechanism adds latency to both uplink and downlink transmissions, because transmissions are delayed until the next Service Period.

Thus, the need exists for an efficient power-save method suitable for QoS applications.

BRIEF SUMMARY OF THE INVENTION

In view of the aforementioned needs, the invention contemplates in one embodiment, a method wherein a power save (PS) 802.11 station notifies its parent AP that it is an automatic power-save delivery (APSD) mode wherein the AP automatically sends frames to the station when it determines that the station is in a "wake up" state, and otherwise buffers downlink frames for the station when the station is in a "doze" state. Ordinarily, a wakeup state is a transient state in a Power-save station wherein the station can receive downlink transmissions, whereas a doze state is a transient state where the station cannot receive downlink transmissions. A power-save station is a station that alternates between the wakeup and doze states. The power-save station in an APSD mode periodically wakes up to send an uplink frame to its parent AP; the AP sets a flag in a data link Acknowledgement (ACK) for an uplink frame to indicate that it has a downlink frame buffered for the PS station; the PS station stays awake to receive the downlink frame. The AP sets a flag in a transmitted frame to indicate when it does not have a buffered downlink frame for the PS station. The PS station then returns to a doze state after it receives the indication from the AP, until it has more uplink frames queued for transmission.

The PS station may be a voice station, defined herein infra. The uplink frames are periodic voice packet transmissions and the uplink voice transmissions effectively query the AP for buffered downlink transmissions at a rate that corresponds to the packet rate for an interactive voice communications stream. The PS station may generate "null" uplink frames during periods of silence suppression to query the AP for buffered downlink transmissions.

One aspect contemplates the PS station establishing scheduled wakeup times with its parent AP, which coincide with 802.11 Beacon transmissions. The parent AP automatically delivers buffered downlink frames to the PS station following the scheduled wakeup times. The PS station suppresses successive "null" uplink frames during periods of silence suppression if the AP indicates it does not have any buffered downlink frames. The PS station then goes into a doze state until its next scheduled wakeup time or until it has an uplink frame queued for transmission.

The method further contemplates the PS station setting a flag in an uplink transmission to indicate that it will stay awake to send one ore more successive uplink frames to the AP. The AP sends a poll frame to the PS station to solicit an uplink transmission and the PS station responds to the poll frame by sending an uplink frame without first sensing the channel to determine if it is idle. This aspect further contemplates that the AP piggybacks a poll on a downlink data frame. Data link Acknowledgements may be piggybacked on uplink or downlink data frames. Either the AP or PS station initially sense the channel idle, then uplink or downlink frames are sent interleaved in a bidirectional burst following the initial channel sense and neither the AP or PS sense the channel to determine if it is idle at the start of each successive frame sent in the burst.

Another embodiment of the present invention contemplates a method comprising the steps of a power-save (PS) 802.11 station notifying its parent AP that it is in an automatic power-save delivery (APSD) mode, wherein the AP automatically sends frames to the PS station when it determines the PS station is in a wakeup state and otherwise buffers downlink frames for the station when it is in a doze state. The PS station negotiates a periodic wakeup schedule with its parent AP, the wakeup schedule comprises a schedule start time and a wakeup period, which is defined as the time between each scheduled wakeup time. Wakeup times are synchronized in the PS station and the parent AP by the standard 802.11 Timer Synchronization Function (TSF). The wakeup period corresponds to the packet rate for an interactive communications session. The AP sends a frame that contains a poll at the start of each scheduled wakeup time, a flag in the poll frame indicates if the AP has a downlink frame for the station. The downlink frame contains an implicit or explicit channel reservation which temporarily inhibits transmissions from other stations, thus the PS station sends a frame in response to the poll without first sensing the channel to determine if its idle. The PS station stays awake following each scheduled wakeup time until the AP sends a frame, which may be a poll frame, with a flag that indicates the AP does not have a downlink frame buffered for the station. In a preferred embodiment, the station is a voice station with an interactive voice application and the uplink frames are periodic voice packet transmissions and wherein the uplink voice transmissions effectively query the AP for buffered downlink transmissions at a rate that corresponds to the packet rate for an interactive voice communications stream.

Another aspect of this embodiment is that a poll may be piggybacked on a downlink data frame. The PS station sets a flag in an uplink frame sent in response to the poll from the AP to indicate that it will stay awake to send one ore more successive uplink frames to the AP. When the AP sends a successive poll to the PS station to solicit an uplink transmission, the PS station responds to the poll frame by sending an uplink frame without first sensing the channel to determine if the channel is idle. Data link Acknowledgements may be piggybacked on uplink or downlink transmissions. The method further contemplates that after the AP initially senses the channel is idle, uplink or downlink frames are sent interleaved in a bidirectional burst following the initial channel sense, wherein neither the AP or PS station sense the channel at the start of each successive transmission in the burst.

When the PS station is a voice station, the PS station sends a message to its parent AP to negotiate a fast wakeup schedule with the parent AP at the start of an interactive voice session. The PS voice station then sends a message to terminate the fast wakeup schedule when the interactive voice session ends.

Another aspect is the AP determines the wakeup schedule start times and wakeup periods and selects non-overlapping scheduled start times and wakeup periods to minimize the time that a station must remain awake.

Yet another aspect is that the voice sampling rate of the PS station is faster than the wakeup/polling rate. Voice samples are immediately queued for transmission. Any available voice samples are then coalesced into a data communications packet just before the scheduled wakeup time to minimize the delay before a sample is received by a peer voice station.

Still yet another aspect of the present invention contemplates a Proxy Address Resolution Protocol (ARP) server in an Access Point (AP) that maintains IP/MAC address bindings for associated client stations. When an AP receives a broadcast ARP request on its Ethernet port, it searches its IP/MAC address bindings for an IP address that matches the target IP address in the body of the of the ARP request. If a matching IP address is found, the AP Proxy ARP server returns a "proxy" ARP Reply, on its Ethernet link, which contains the MAC address that corresponds to the target IP address.

As an alternate solution, the Proxy ARP server can translate the destination broadcast MAC address in an ARP Request to the unicast MAC address that corresponds to the target IP address. The resulting unicast ARP Request frame can then be forwarded to the target station, as any other (i.e. power-save) unicast message, so that the station can generate an ARP Reply. Therefore, the ARP server in the AP does NOT need to generate a proxy ARP Reply.

An 802.11 client station does not need to receive broadcast ARP requests if the Proxy ARP server in the parent AP "knows" the client's IP address. An AP can automatically determine the IP address of a client by "snooping" IP and ARP packets sent by the client. However, a client may not send an IP or ARP packet each time that it roams to a new parent AP. Therefore, a client can register its IP address with its parent AP by including a (i.e. proprietary) IP address element in its 802.11 Reassociation Request messages. As an alternate solution, the IP address of a client can be transferred to a new parent AP over the network infrastructure.

As used throughout this specification, unless otherwise explicitly defined, the following terms are defined as follows:

AP—802.11 access point;

Burst—a sequence of frames sent in rapid succession following a single channel access;

CODEC—A voice Coder/Decoder, including any support software;

Downlink—from the AP to a client station;

Uplink—from a client station to the AP;

Silence Suppression—A method where a voice CODEC automatically determines when the local speaker is idle, during an interactive voice session, and automatically suppresses packet transmissions during such idle periods;

Voice station—An 802.11 client station that contains an interactive voice application, where a Voice CODEC converts periodic analog voice samples into a digital, packetized voice communications stream;

Wakeup State—A transient state in a Power-save station, where the station can receive downlink transmissions;

Doze State—A transient state in a Power-save station, where the station cannot receive downlink transmissions; and Power-save (PS) station—A station that is alternating between the transient Wakeup and Doze states according to a predetermined set of rules.

While the specification of the present invention often refers to a Quality-of-Service Station (QSTA) and a Quality-of-Service Access Point (QAP), as those skilled in the art can readily appreciate the present invention are adaptable to all types of wireless stations and access points respectively. Furthermore, while the preferred embodiments of the present invention are directed to 802.11 networks, they are suitable for any type of wireless networking.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWING

The accompanying drawings incorporated in and forming a part of the specification, illustrates several aspects of the present invention, and together with the description serve to explain the principles of the invention. In the drawings.

DETAILED DESCRIPTION OF INVENTION

Throughout this description, the preferred embodiment and examples shown should be considered as exemplars, rather than limitations, of the present invention.

Figure 1:
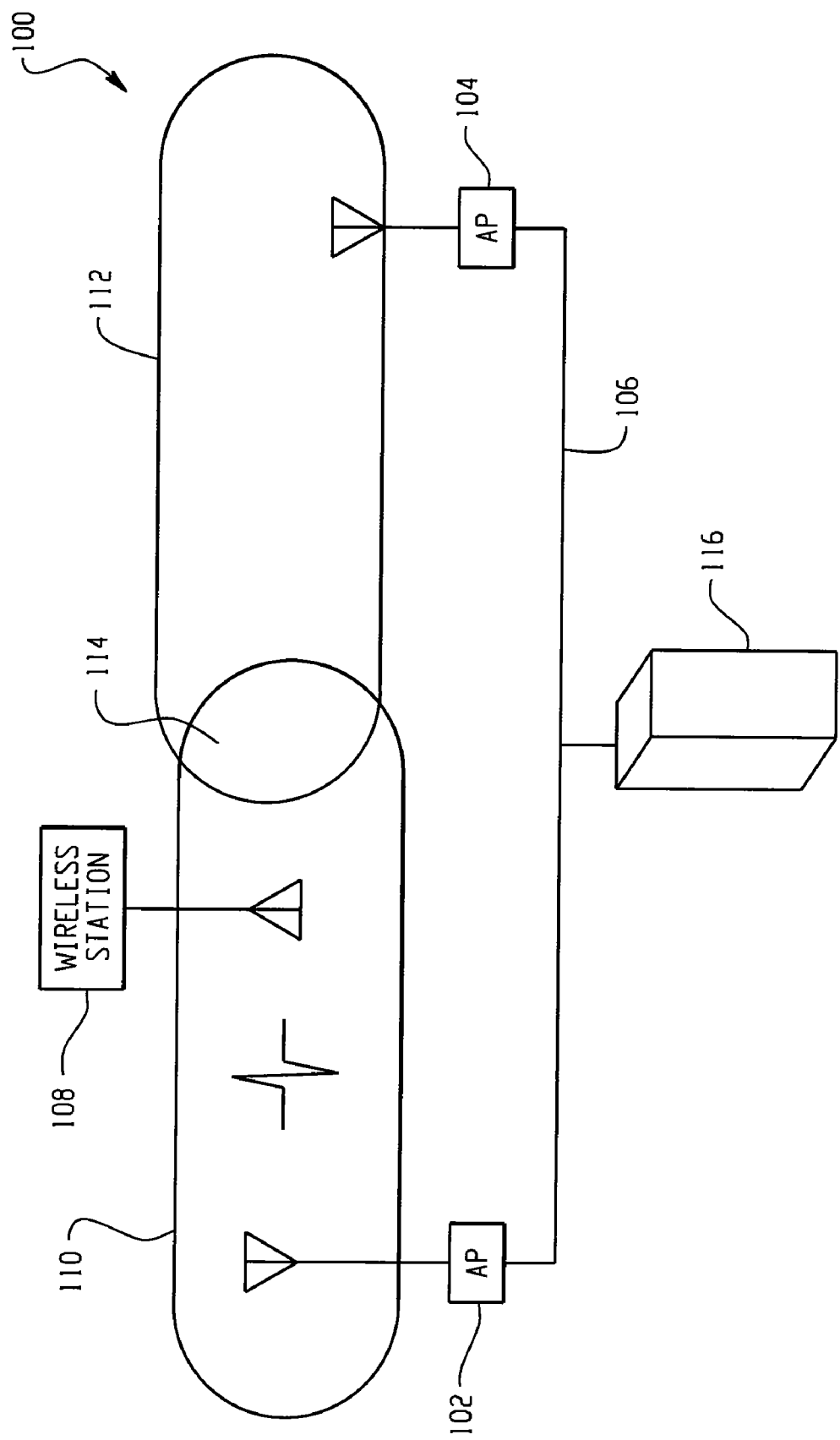
FIG. 1 is a block diagram showing the typical components of an 802.11 network.

Referring first to FIG. 1 there is illustrated a block diagram of a typical 802.11 network 100. The network 100 comprises two access points 102 and 104. Access Point 102 has a coverage area 110 and Access Point 104 has a coverage area 112. An overlap area 114 exists between coverage area 110 and coverage area 112. A wireless station 108 is shown as being within Access Point 102's coverage area 110. The wireless station 108 may travel between Access Point 102's coverage 110 and Access Point 104's coverage area 112, a process typically known as roaming. Usually when wireless station 108 roams from coverage area 110 to coverage area 112, it will change which access point it associates while passing through the overlap area 114. A backbone 106 is used to connect Access Point 102 and Access Point 104. Typically the backbone is a wired network connection, such as Ethernet, however any suitable means, wired or wireless, and any standard networking protocol, may be used. An authentication server 116 is also shown connected to backbone 106. Ordinarily the authentication server is used by an access point to authenticate wireless station 108 when it first associates with an access point, such as Access Point 108. While the aforementioned network 100 shows two access points and a single wireless station, as those skilled in the art can readily appreciate the network may comprise an any number of access points and any number of wireless stations.

Figure 2:
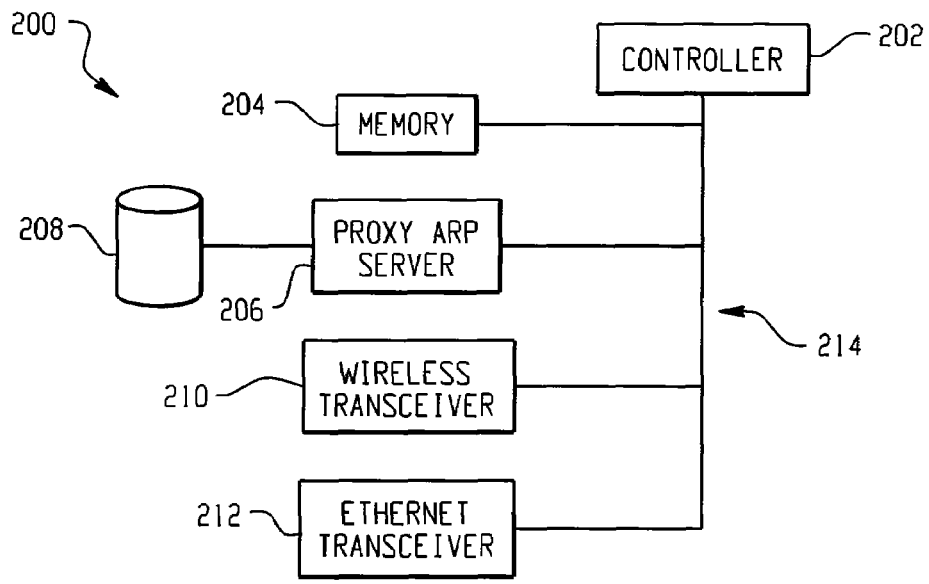
FIG. 2 is a block diagram of the components of an Access Point contemplated by an embodiment of the present invention.

Referring now to FIG. 2 there is illustrated the typical component parts of an access point 200 as contemplated by the present invention. The access point 200 has a controller 202 for controlling the operations of the access point 200. Typically, the controller 202 is microprocessor based. Memory 204 is used by the controller 202 for storage. Memory 204 may be comprised of Random Access Memory (RAM), Read Only Memory (ROM), Non-Volatile Random Access Memory (NVRAM), other types of memory and combinations thereof. The typical access point 200 comprises a wireless transceiver 210 and an Ethernet transceiver 212. The wireless transceiver 210 is used to send and receive messages with wireless stations. The Ethernet transceiver 212, for sending and receiving messages along the backbone (106—FIG. 1) between access points. The access point 200 in this example also comprises a Proxy ARP server 206 with its own memory 208. The Proxy ARP server 206 may be implemented in software, hardware, or a combination thereof. The storage 208 may comprise disk type memory, RAM, or other memory which is used for storing IP and MAC bindings for wireless stations associated with the access point 200. It is also possible that the Proxy ARP Server may share memory 204 with the Controller 202 instead of having its own separate memory 208.

One aspect of the present invention is a new polled+EDCF access method that combines polled and EDCF channel access. Another aspect of the present invention is a new Scheduled Wakeup Time power-save method that replaces the current 802.11e Schedule method and encompasses the 802.11e APSD method. The distributed TSF timer is used to synchronize wakeup times. Another aspect of the present invention is that consistent power-save state transition rules are defined. A QSTA can set the More Data bit in a QoS frame to initiate unscheduled wakeup periods (i.e. to indicate that it has frames buffered for transmission).

Another aspect of the present invention is that the error recovery rules for Hybrid Coordination Function (HCF) polling are simplified and are more robust. HCF and, optionally, EDCF QSTAs can establish wakeup periods with arbitrary start times and application-specific periods. A QAP can implement a single, simple timer mechanism that supports both power-save scheduling and periodic polling. Furthermore, a QAP can implement polling for power-save "beaconing" purposes without implementing more complex error recovery for polled access. Less data is crowded into periods immediately following Beacon transmissions. QSTAs that are scheduled for HCF polling can use EDCF to minimize latency. Polling can be used to arbitrate EDCF contention. By using the present invention, uplink and downlink transmissions can be interleaved so that the channel is used more efficiently.

Figure 3:
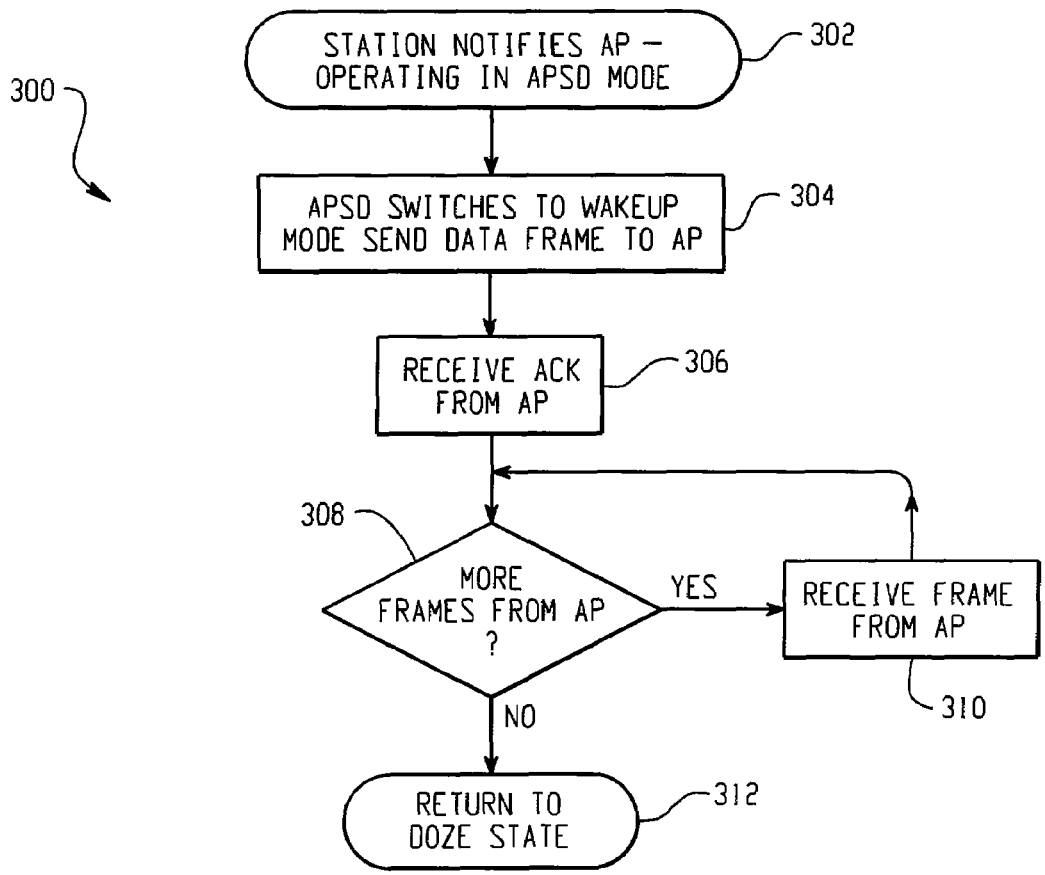
FIG. 3 is a block diagram showing the steps of a method contemplated by the present invention.

Referring now to FIG. 3, there is illustrated the steps of a method 300 contemplated by the present invention. The method 300 begins at step 302 when a station notifies an AP that the station is operating in APSD mode. If there are no uplink or downlink frames being buffered, the station would then go to a doze state (not shown). At step 304 the station switches to wakeup mode and sends a data frame to the AP. The station then waits and at step 306 receives an Acknowledgement (ACK) from the AP. The ACK would have either a flag set or a more data bit to indicate whether the AP has more frames for the station. At step 308 the flag or more bit is examined to determine whether the AP has more frames for the station. If there are more frames, then as shown at step 310 the station receives a frame from the AP. Processing then returns back to step 308. When at step 308 it is determined that there are no more frames waiting at the AP, then at step 312 the station returns to a doze state.

Figure 4:
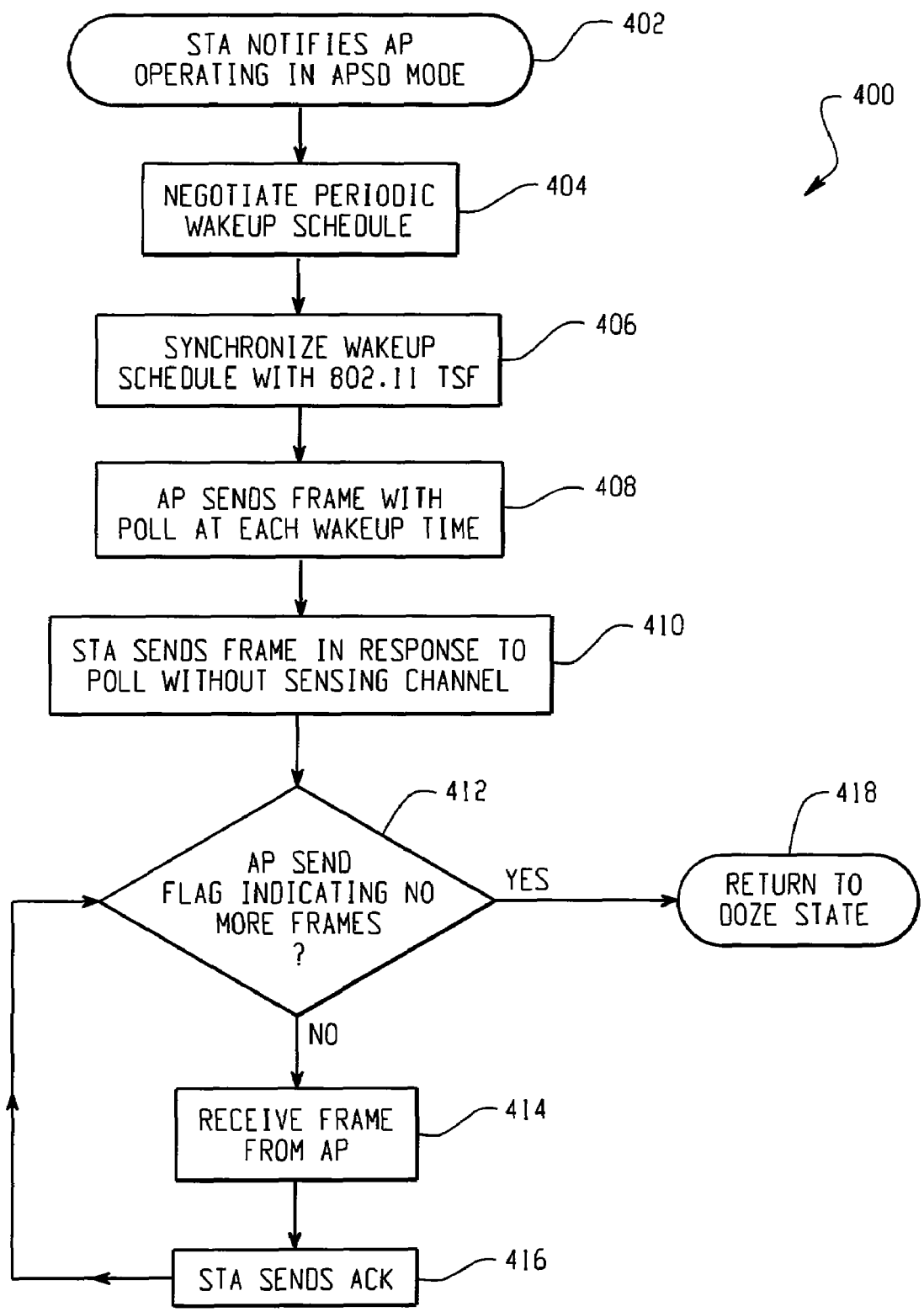
FIG. 4 is a block diagram showing the steps of a method contemplated by the present invention.

Another method 400 contemplated by the present invention is shown in FIG. 4. At step 402, a station notifies an AP that it is operating in an automatic power-save delivery (APSD) mode. At step 404 the station and the AP negotiate a periodic wakeup schedule. At step 406 the wakeup schedule is synchronized with the 802.11 Timer Synchronization Function (TSF). At step 408 the AP sends a frame with a poll at each scheduled wakeup time. At step 410 the station sends a frame in response to the poll without first sensing the channel to determine if the channel is idle. The station then determines if the poll sent in step 408 has a flag set to indicate it has a buffered downlink frame for the station.

If at step 412 the AP has frames, then at step 414 the station receives the frame from the AP and an ACK is sent at step 416. Step 412 is repeated, this time examining the frame sent from the AP to determine if the AP has another frame for the station. If the AP does have another frame for the station, then steps 414 and 416 are repeated. When at step 412 it is determined that the AP has no more frames for the station, then the station returns to a doze state as shown in step 418.

Another aspect of the present invention is a Polled+EDCF access that is defined with the following rules:
1) A QSTA, which has established periodic polling for a traffic stream, may use EDCF access to transmit an uplink frame for the traffic stream. It may also use EDCF access to retransmit an uplink frame, if an expected (QoS) ACK is not received.
2) If a QSTA transmits an uplink frame in response to a poll, and it does not receive an expected ACK, then it must increment its Retry Count for the respective Access Category and execute a post-TX backoff, before retransmitting the frame with EDCF access.
3) A QSTA can transmit, at most, 1 uplink data frame in response to a poll from the QAP. The uplink frame may consist of multiple fragments.
4) A QAP enables uplink bursting with polled access by sending a QoS (+)CF-Poll to a QSTA when it receives an uplink QoS frame with the More Data bit set to '1' or with a non-zero queue size.
5) A QAP can, optionally, retransmit a poll frame if it does not receive an expected response; however, a QAP should not exhaustively retransmit polls to a power-save station that may have returned to the "Doze" state.

Rule 3 supra resolves the ambiguity in the error recovery rules for polled access in the current 802.11e draft. In a common collision scenario, under the current 802.11e recovery rules, both the QAP and QSTA will repeatedly retransmit after the channel is idle for a PIFS time, causing repeated collisions.

Figure 5:
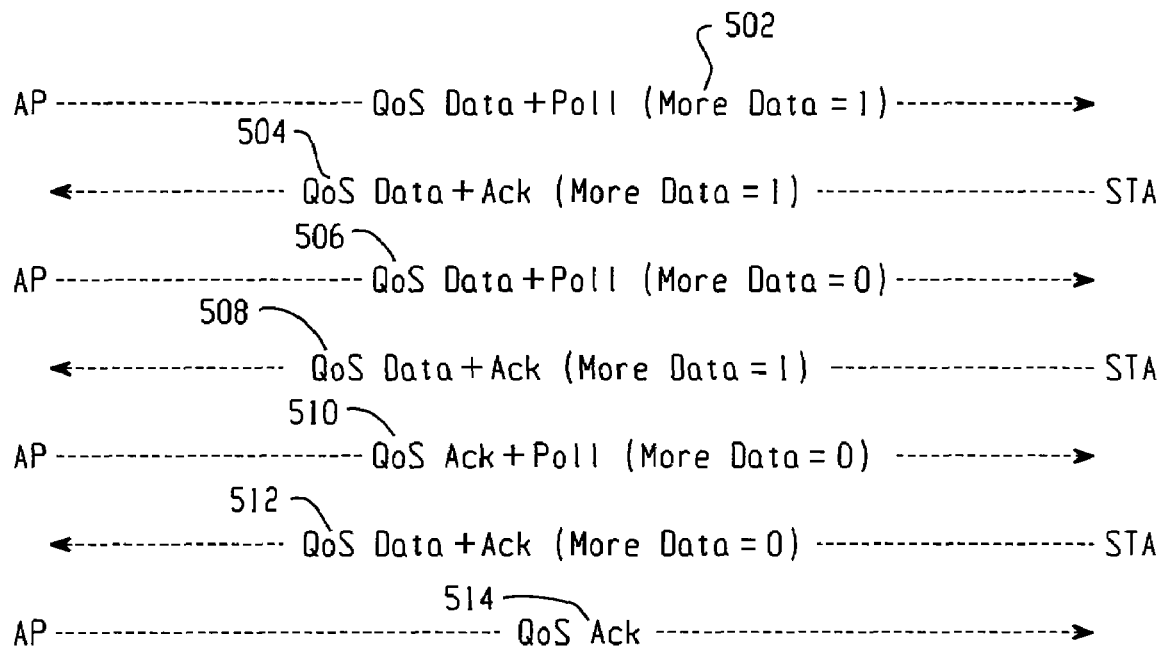
FIG. 5 is an example frame exchange sequence using polled+EDCF access.

An example frame exchange sequence, using the above rules, is shown in FIG. 5. Note that rule 3 does NOT prevent a QSTA from bursting uplink frames because the QAP can poll for successive uplink frames. At step 502 an AP sends to the station QoS data, and a poll with an acknowledgement (ACK) with the more data flag set to indicate it has additional downlink frames for the station. In this scenario, the station also has an uplink frame for the AP, so at step 504 the station sends to the AP QoS data and an ACK with the more data flag set to indicate it has another uplink frame for the AP. At step 506 the AP sends QoS Data and a poll, but this time with the more data flag set off. The station responds at step 508 with QoS data and an ACK with the more data flag set. At step 510 the AP only sends to the station a QoS ACK and a poll. The AP indicated at step 506 it had no more data for the station so it only sends the QoS ACK and the poll. When the station receives the ACK, at step 512 it sends to the AP QoS Data and an ACK, however this time the more data flag is set to off. Therefore, at step 514 the AP sends a QoS ACK to the station and the transmissions between the AP and station are completed. In a preferred embodiment, the AP senses if the channel is idle only before step 502, and no further channel idle sensing is performed by either the AP or the station after step 502.

Figure 6:
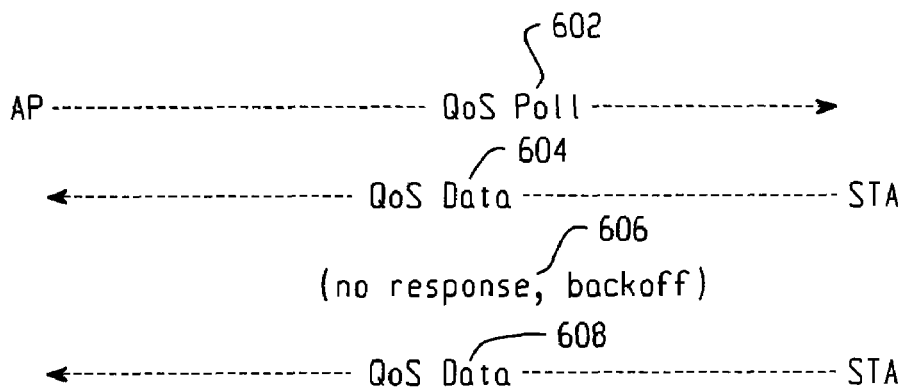
FIG. 6 is an example frame exchange sequence using polled+EDCF access wherein a station executes a post-TX back-off and uses EDCF to send an uplink frame after an expected ACK is not received.

In the example sequence shown in FIG. 6, a station (QSTA) executes a post-TX backoff and uses EDCF to send an uplink frame after an expected ACK is not received. The process starts at step 602 when the AP sends a QoS poll to the station. At step 604 the station sends QoS data to the AP. At step 606 the station determines it has not received a response to the QoS data sent in step 604 and begins a post-TX back-off. Then at step 608 the station senses the channel idle following the post-TX back-off and uses EDCF to send the QoS Data (uplink) frame.

As those skilled in the art can readily appreciate, the Polled+EDCF access method is useful for both power-save and active stations. For active stations, the Polled+EDCF access mechanism can be used to minimize latency on a lightly to moderately loaded channel and to arbitrate EDCF contention during periods of congestion: A QSTA can use 802.11e TSPEC signaling to establish a "Service Schedule". The QAP can start a poll timer, for a QSTA in active mode, with a period that is marginally longer that the Service Schedule period. The poll timer can be restarted each time that a set of 1 or more uplink frames is received from the QSTA. If the poll timer expires, because the QSTA did not send an uplink frame, then the QAP can poll the QSTA (i.e. to arbitrate contention). For power-save QSTAs, the Polled+EDCF access mechanism can be used to generate periodic polls at the start of a "Wakeup Period". The periodic polls function much like per-QSTA Beacons, because they enable a QSTA to immediately return to a Doze state, in the absence of other traffic. For example, a QSTA can wake up at its scheduled Wakeup Time, received a poll, and immediately return to the Doze state if a flag in the poll indicates that the AP does NOT have any downlink frames buffered for the QSTA.

Another aspect of the present invention is an extension to the current APSD mechanism where a QSTA can establish periodic scheduled Wakeup Times that may or may not be aligned with Beacon transmissions. A QSTA must be awake at each scheduled Wakeup Time and it must remain awake with the same rules as for the current APSD mechanism. A "scheduled Wakeup Period" starts at the scheduled Wakeup Time and ends when the QSTA receives a downlink frame with the More Data bit set to '0' or it receives a Beacon with its TIM bit set OFF. The QAP establishes the "Start Time" of a periodic Wakeup Time schedule as a TSF timer value, and establishes a Wakeup Period as an integer multiple of TSF timer ticks. The QAP can establish non-overlapping wakeup schedules for multiple stations to minimize contention and to minimize the time that a QSTA must stay awake. Wakeup Period synchronization between the QAP and a QSTA is achieved via normal TSF timer synchronization; therefore, the mechanism solves the synchronization issue associated with the current 802.11e Service Schedule mechanism. Note that an AP and all associated stations share a single, distributed TSF timer.

The "Wakeup Time" mechanism described herein is an extension of the enhanced APSD mechanism described in 802.11 document 03/107r1. The proposed Wakeup Time mechanism integrates the 03/107r1 mechanism with TSPEC signaling and supports "unscheduled Wakeup Periods". The changes needed for the Wakeup Time mechanism are listed below:
1) The APSD Schedule element defined in document 03/107r1 replaces the Schedule element in the current 802.11 draft is replaced.

2) A QSTA that uses TSPEC signaling to establish periodic polling does not need to request a schedule with an APSD Request element (as proposed in document 03/107). Instead, a QAP can derive a schedule from TSPEC parameters and asynchronously send an APSD Schedule element to establish a Wakeup Schedule for such a power-save QSTA.

3) The APSD signaling mechanism can, optionally, be extended, as described in document 03/107r1, so that a QSTA can request scheduled Wakeup Times without TSPEC signaling. The QAP can override the requested schedule with the APSD Schedule element.

4) A QSTA can initiate an unscheduled Wakeup Period at any time by sending an uplink QoS frame with the More Data bit set to '1'.

5) A QAP can initiate an unscheduled Wakeup Period by sending a downlink QoS (i.e. ACK) frame with the More Data bit set to '1'.

6) An 802.11 WakeupWaitTime parameter can, optionally, be set to the time that a station should wait before transmitting an uplink frame at each scheduled Wakeup Time.

7) A QSTA that has established scheduled Wakeup Periods can also send PS-Poll frames.

As described in document 03/107r1, scheduled Wakeup Times may or may not be aligned with Beacon transmission times, and the inter-Wakeup-Time period may or may not be an integer multiple of Beacon periods. A QAP can easily translate Beacon-based wakeup parameters into time-based parameters. Note that a QSTA can use the APSD mechanism as defined in the current 802.11e draft to establish Wakeup Times that are aligned with Beacon transmissions.

The following definitions are used to define power-save state transitions: A "Wakeup Period" is a period of time where a QAP can transmit data and or poll frames to a power-save QSTA. A Wakeup Period starts at a "Wakeup Time". A "scheduled Wakeup Period" follows a "scheduled Wakeup Time". A non-AP QSTA can initiate an "unscheduled Wakeup Period" at anytime. A power-save QSTA is in a "Wakeup" state during a Wakeup Period. A power-save QSTA that is not in the Wakeup state is in the "Doze" state. Note that both the QAP and QSTA must agree on the QSTA's power-save state. The following rules for power-save operation with the Wakeup Time mechanism are contemplated by the present invention:

1) A QSTA that is operating in "active" mode is never in the Wakeup or Doze states. Any existing Wakeup Time schedule is deleted when a QSTA transitions to active mode.

2) A wakeup schedule established by the QAP, with an APSD Schedule element, overrides any existing schedule (e.g. established with an APSD request).

3) If a periodic wakeup schedule is established for a power-save QSTA, then the QSTA automatically transitions to the Wakeup state at each scheduled Wakeup Time.

4) A QSTA in the Doze state transitions to the Wakeup state each time that it transmits an uplink QoS frame with the More Data bit set '1'.

5) A QSTA in the Doze state transitions to the Wakeup state if it receives a downlink QoS frame (i.e. an ACK frame) with the More Data bit set to '1'.

6) If a QSTA does not receive the ACK for an uplink QoS frame, and all successive retransmission of the uplink frame, then it transitions to the Wakeup state.

The rules for terminating a scheduled or unscheduled Wakeup Period are as follows:

7) A QSTA in a scheduled Wakeup Period or an unscheduled Wakeup Period initiated by the QAP transitions to the "Doze" state when it receives a frame from the QAP with the More Data bit set to '0' or a TIM with its Association ID (AID) bit set to '0'.

8) A QSTA in a self-initiated unscheduled Wakeup Period transitions to the Doze state after it sends an uplink frame with the More Data bit set to '0' and then either receives a downlink frame with the More Data bit set to '0' or receives a Beacon with its TIM bit set to '0'.

9) If Wakeup Periods overlap, then the periods are aggregated and terminate at the same time with the aggregate set of rules. For example, if an unscheduled Wakeup Period initiated by a non-AP QSTA overlaps into a scheduled Wakeup Period, then both wakeup periods end after both the QAP and QSTA send a frame with the More Data bit set to '0'.

Figure 7:
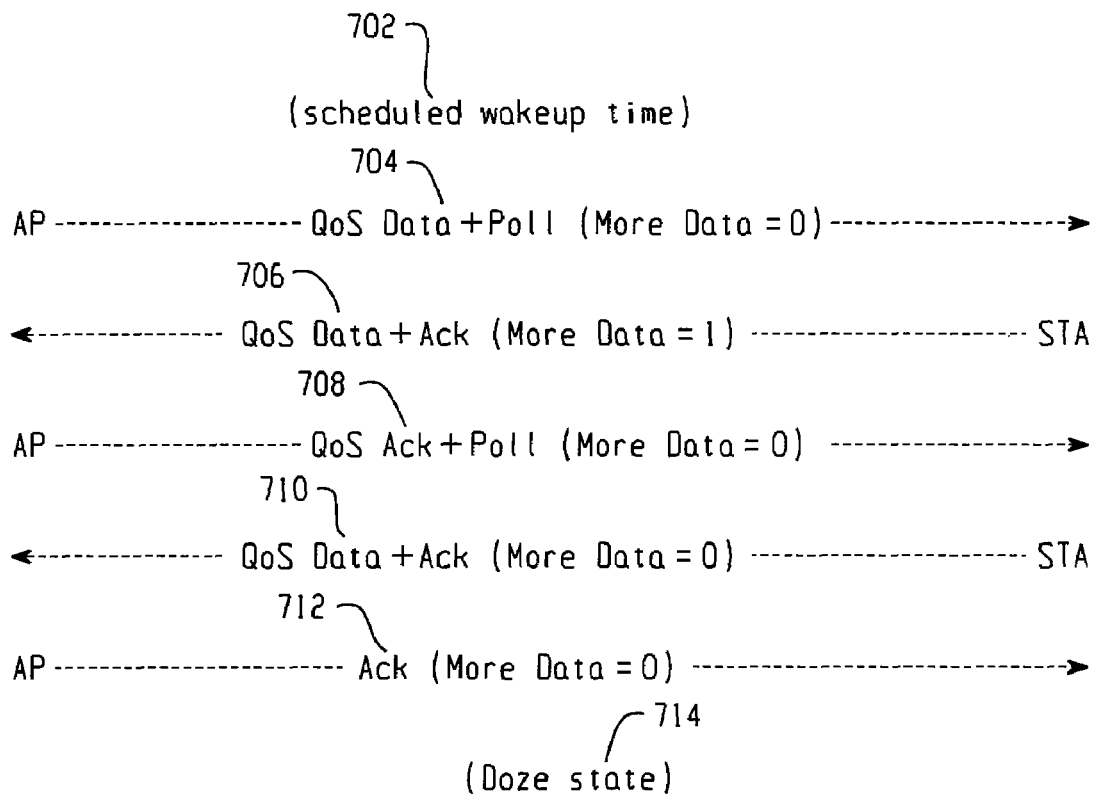
FIG. 7 is an example frame exchange sequence using a scheduled wakeup period.

Rule 3 above, supra, enables the QAP to continue polling a QSTA, with a non-zero transmit queue size, after the QAP has indicated it does not have any more downlink data, as illustrated in FIG. 7. Step 702 is the scheduled wakeup time for the station. At step 704 the AP sends a QoS Data+a Poll with the more data flag step to indicate it has no further traffic for the station. At step 706 the station responds with QoS data and an Ack with the more data flag set to indicate it has more data to send. Because the station has more data to send it remains in a wakeup state. The AP responds with a Qos Ack and a poll with the more data flag set to zero to indicate the AP has not additional traffic as shown in step 708. at step 710 the station sends QoS data and an Ack with the more data flag set to indicate the station has no more data to send. At step 712 the AP responds with an Ack with the more data flag set to indicate the AP has no more data for the station. Because neither the AP or station have more data to send, at step 714 the station returns to a doze state.

Figure 8:
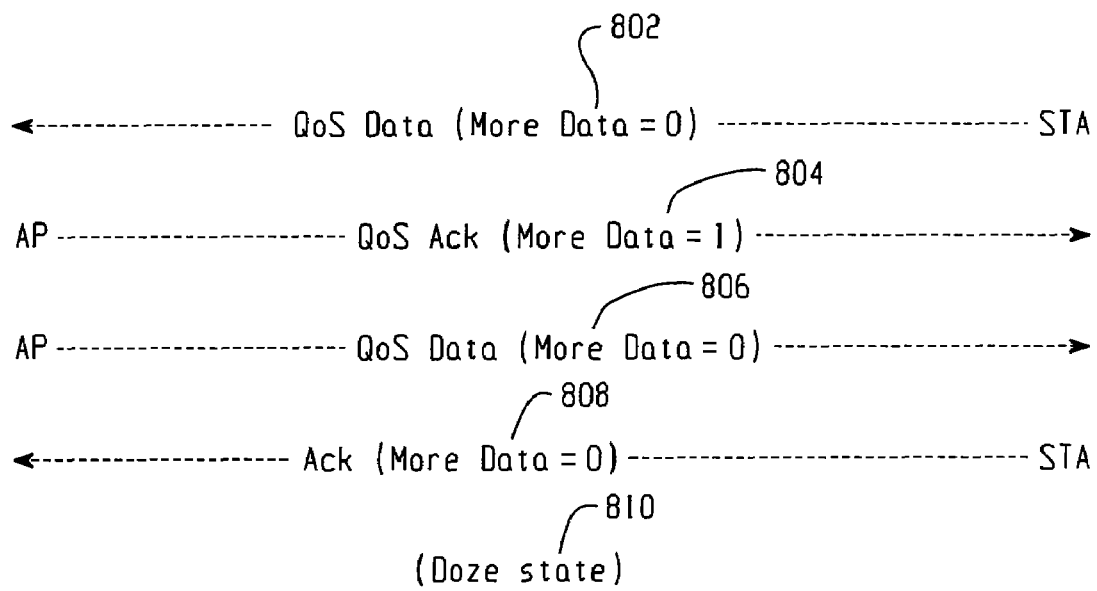
FIG. 8 is an example frame exchange sequence in an unscheduled wakeup period initiated by the station.

Rule 4 supra enables the QAP to deliver downlink frames to a QSTA in an unscheduled Wakeup Period initiated by the QSTA, as illustrated in FIG. 8. At step 802 the station sends QoS data to the AP with the More Data set to 0, indicating it has no more uplink frames. After the AP receives the QoS data sent in step 802, it sends a QoS ACK with the More Data flag set on (1) to indicate it has a buffered downlink frame for the station. Then at step 806 the AP sends the QoS Data, the More Data is set off to indicate it has no additional data. At step 808 the station responds with an ACK with the More Data flag set off, and thus at step 810 returns to the Doze state. If at step 806 the More Data flag was set on, then steps 806 and 808 would repeat until the AP has sent all the buffered frames to the station.

The Scheduled Wakeup Time (SWT) mechanism is not effective unless there is a frame transmitted at the start of each scheduled Wakeup Period. For example, if a QSTA wakes up and the AP does not transmit a frame, then the QSTA must remain awake until it receives a TIM in the next Beacon.

Figure 9:
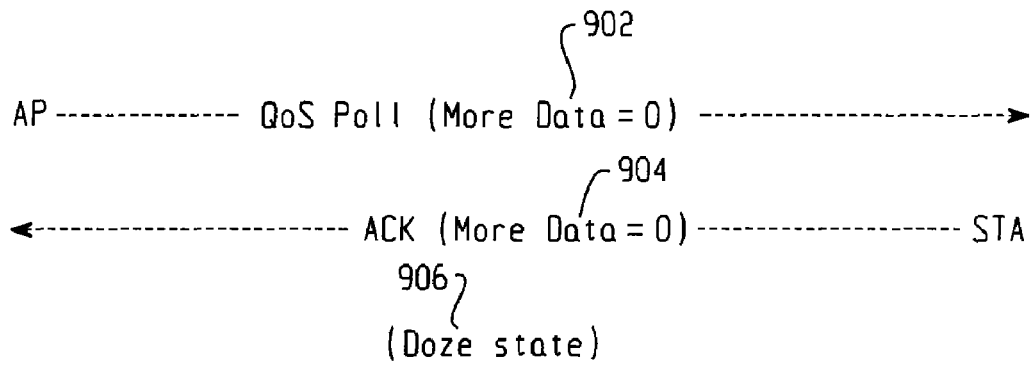
FIG. 9 is an example frame exchange sequence when neither the AP and station have data to transmit.

The Scheduled Wakeup Time (SWT) mechanism is effective for QSTAs that have established an HCF polling schedule (i.e. via TSPEC signaling) that coincides with the QSTA's wakeup schedule. Such a polling schedule guarantees that a QSTA will receive a, possibly piggybacked, poll near the start of each scheduled Wakeup Period. The scheduled poll functions much like a per-QSTA Beacon for power-save purposes. The frame exchange sequence for the case where neither the QAP nor QSTA have data to transmit is shown in FIG. 9. At step 902 the AP sends a QoS poll with More Data set off to the station. The station responds at step 904 by sending an ACK with the more Data set off to the AP. Since neither the station or the AP have frames to send, at step 906 the station returns to the Doze state.

In the example of FIG. 9, the station can return to the Doze state immediately after it receives the poll and sends the ACK, both with the More Data bit set to '0'. Note that, in the absence of the poll or other downlink frame, the rules require the QSTA to remain awake until it receives a TIM (e.g. in the next Beacon).

Figure 10:
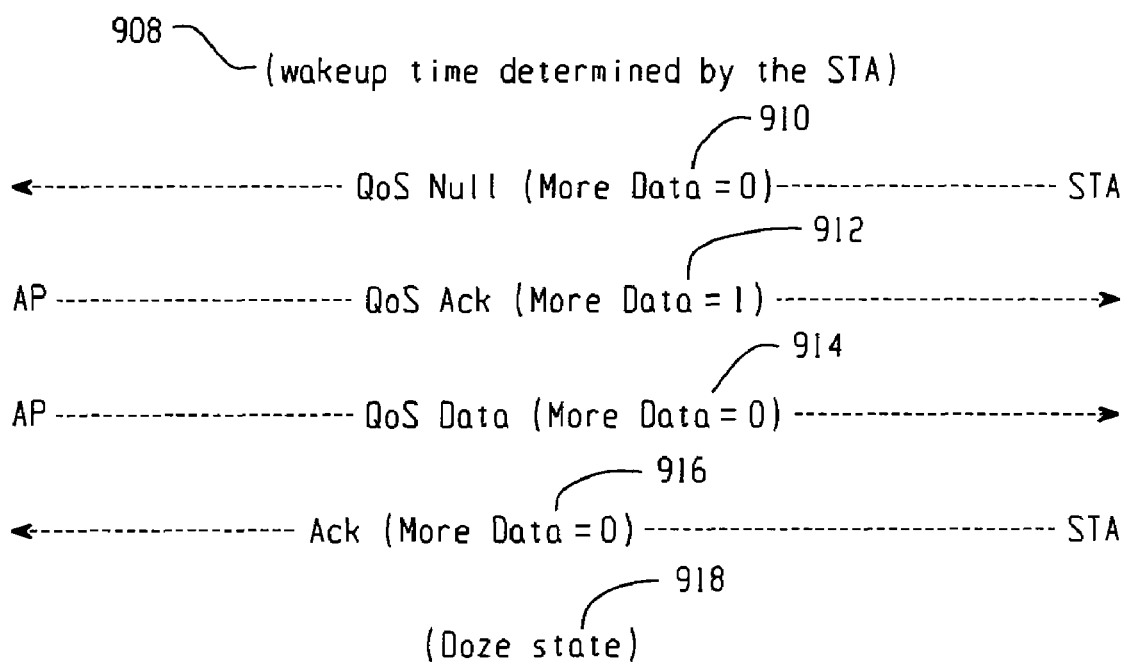
FIG. 10 is an example frame exchange sequence for a reverse poll.

In the current 802.11e draft, a problem exists in the above frame exchange sequence if the ACK frame is lost. The QSTA is prohibited from using EDCF to transmit uplink frames for the "polled" QoS traffic stream. Therefore, the AP must retransmit polls to the QSTA, until it receives an expected response. Note that all poll retransmissions will also fail if the WSTA returns to the Doze state after the ACK is lost. The problem is partially addressed by allowing a QSTA to use EDCF to transmit a frame, if an expected poll is not received, so that the QAP does not have to exhaustively retransmit polls. A QAP does not need to exhaustively retransmit a poll frame, when an expected response is not received, if the access method is polled+EDCF. Polled+EDCF access also enables a QSTA to effectively "reverse poll" a QAP, for buffered power-save frames, at times and intervals determined by the QSTA. No additional scheduling or QSTA/QAP synchronization is required. The reverse polling mechanism is illustrated in FIG. 10.

As shown at step 908, the wakeup time is determined by the station. Once the station is in a wakeup state, then as shown in step 910, the station sends a QoS Null with More Data set off. The AP in this example responds with a QoS ACK with More Data set on to indicate it has more frames at step 912. Then at step 914 the AP sends the QoS Data to the station. At step 914 More Data is set off, indicating to the station that the AP has no more downlink frames. The station responds by sending an ACK as shown at 916 to the AP with the More Data set off, and then as shown at step 918 returns to a Doze state.

Implementation Considerations:

The present invention facilitates a simple HCF scheduler, where polls are simply queued for transmission as any other frame, or a more complex scheduler that approximates time-division multiplexing.

Beacon-based parameters in an APSD element can easily be translated to time values; therefore, the QAP can implement a single timer mechanism that supports any wakeup schedule (i.e. Beacon-aligned or unaligned). The same timer mechanism can be used to generate polls at the start of each wakeup period.

The AP can modify schedule start times and wakeup intervals, with the APSD Schedule element, to minimize overlap of Wakeup Periods. The AP can also modify Wakeup Periods to accommodate less granular timers.

A QSTA can easily change its wakeup schedule. For example, a VoIP QSTA in the standby state can established a relatively slow wakeup schedule, where wakeup times are aligned with Beacon transmissions. The VoIP QSTA can establish an unaligned, faster wakeup schedule when it has an active call.

Another aspect of the present invention contemplates a Proxy ARP server in an AP that maintains IP/MAC address bindings for associated client stations. When an AP receives a broadcast ARP request on its Ethernet port, it searches its IP/MAC address bindings for an IP address that matches the "target IP address" in the body of the ARP request. If a matching IP address is found, the AP Proxy ARP server returns a "proxy" ARP Reply, on its Ethernet link, which contains the MAC address that corresponds to the target IP address. As an alternate solution, the Proxy ARP server can translate the destination broadcast MAC address in an ARP Request to the unicast MAC address that corresponds to the target IP address. The resulting unicast ARP Request frame can then be forwarded to the target station, as any other (i.e. power-save) unicast message, so that the station can generate an ARP Reply. Therefore, the ARP server in the AP does NOT need to generate a proxy ARP Reply.

An 802.11 client station does not need to receive broadcast ARP requests if the Proxy ARP server in the parent AP "knows" the client station's IP address. An AP can automatically determine the IP address of a client by "snooping" IP and ARP packets sent by the client station. However, a client station may not send an IP or ARP packet each time that it roams to a new parent AP. To solve the problem, a client station can register its IP address with its parent AP by including a (i.e. proprietary) IP address element in its 802.11 Reassociation Request messages. As an alternate solution, the IP address of a client station can be transferred over the network infrastructure to a new parent AP when a client roams.

An attempt to quantify the 802.11 "radio" power savings facilitated by Proxy ARP will now be described. The analysis does NOT consider the power consumption of the host computer or radio power consumption in the "sleep" state.

A power-save 802.11 station does not need to stay awake to receive power-save multicast/broadcast transmissions if a) a Proxy ARP server is generating proxy ARP Replies for the client, b) the client does not need to receive any other multicast messages, and c) the client is aware of the Proxy ARP service. The last requirement can be addressed in a couple ways. A client can be configured to rely on Proxy ARP services. However, such a solution requires manual user configuration and the client cannot roam to APs that do not provide the Proxy ARP services. As a better solution, an AP can "advertise" that it is providing a Proxy ARP service via a (i.e. proprietary) element contained in (Re)Association Response messages.

In the example analysis infra, the wakeup duty cycle is first calculated for a power-save station that must receive multicast/broadcast transmissions. The duty cycle is then calculated for a power-save station that does not need to receive multicast/broadcast transmissions. The power-save benefits of Proxy ARP are highly dependent on the client application, the amount of broadcast/multicast traffic that is forwarded onto 802.11 links, and 802.11 channel parameters and characteristics. The following assumptions are used:

1) 0.4% of a 100 Mbps Ethernet LAN is used for broadcast/multicast traffic that is forwarded on 802.11 links, which translates to a multicast data rate of 400 Kbps.*;

2) The base multicast rate is 5.5 Mbps.**;

3) 802.11 multicast frames are transmitted with short PHY headers. The PHY header is transmitted at 2 Mbps;

4) Multicast frames are delivered with DCF channel access and the CWmin value is 31;

5) Channel contention for multicast transmissions is minimal;

6) The mean multicast packet size is 500 bytes. Therefore, the multicast packet rate is 100 packets per second; and 7) The application is not generating or receiving frames.

*The amount of IP multicast traffic that is forwarded on 802.11 links can be significantly reduced by enabling "IGMP Snooping" on switches connected to 802.11 APs. "IGMP Snooping" is enabled by default on Cisco Switches. If "IGMP Snooping" is enabled on switches then the "IGMP General Query" option should be enabled on APs. The "IGMP General Query" option is disabled, by default, on Cisco APs, available from Cisco Systems, Inc. 170 West Tasman Dr., San Jose, Calif. 95134, an affiliate of the assignee of the present invention, Cisco Technoloy, Inc at the same address.

\*\*Multicast/broadcast traffic is transmitted at a "base multicast rate" on 802.11 links, which is often lower than the highest rate in the "basic rate set".

| Per packet transmission time: | |
|---|---|
| The MAC header and FCS is 8 × 24 bytes = 192 bits Mbps. = | 96 usec. |
| The payload is 8 × 500 bytes = 4000 bits @ 5.5 Mbps. = | 727 usec. |
| The mean post TX backoff is 16 slot times = | 320 usec. |
| DIFS (inter-frame space) | 30 usec |
| Total = | 1173 usec |

Total time per second=1.17 msec/packet×100 packets/sec.=117 msec/sec Therefore, 11.7 per cent of the bandwidth is used for multicast (in the absence of channel contention).

In this example, the duty cycle for a power-save station, which must receive multicast/broadcast frames, is approx. 12.0% (which includes the overhead for receiving all DTIM Beacons).

A power-save VoIP station, in standby mode, must wake up periodically to receive beacons, even if it does not need to receive multicast/broadcast. The station's bit in the TIM is set if the AP has power-save frames buffered for the station. It is reasonable to assume that a VoIP station, in standby mode, must wake up at least once every 0.5 seconds to minimize call setup latency. In the absence of contention, the station should be able to wake up, receive a beacon, and return to the doze state in 1-2 msec. Therefore, the duty cycle for a station that does not need to receive multicast/broadcast is approx. 0.2%.

In this example, Proxy ARP can potentially reduce power consumption by a factor of 50-to-1. Again, note that the most significant contributing factor is the amount of multicast/broadcast traffic—which is highly variable.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of the ordinary skill in the art to utilize the invention in various embodiments and with various modifications as are suited to the particular use contemplated. All such modifications and variations are within the scope of the invention as determined by the appended claims when interpreted in accordance to the breadth to which they are fairly, legally and equitably entitled.

What is claimed is:

1. A method for an 802.11 station to save power, the station switching between a wakeup state and a doze state, the steps comprising:
   switching to a doze state;
   switching to a wakeup state;
   transmitting an uplink frame to an access point;
   receiving an acknowledgement for the uplink frame from the access point, with a flag set in the acknowledgement to indicate that the access point has frames buffered for the station;
   receiving a buffered downlink frame from the access point;
   returning to the doze state only after a flag in the buffered downlink frame indicates that the access point does not have another buffered downlink frame for the station;
   sensing when the channel is idle;
   sending at least one uplink frame interleaved in a bidirectional burst of uplink and downlink data frames following the initial channel sense; and
   sending at least one successive uplink frame without sensing when the channel is idle;
   wherein the power consumption in the doze state is less than the power consumption in the wakeup state.

2. The method of claim 1 further comprising notifying an access point at the 802.11 station is operating in an automatic power save delivery mode.

3. The method of claim 1 wherein the 802.11 station is a voice station and the uplink frame is a periodic voice packet transmission, the method further comprising querying the access point for buffered downlink transmissions at a rate that corresponds to a packet rate for an interactive voice communications stream.

4. The method of claim 3 further comprising sending a predetermined uplink frame during a period of silence suppression to query the access point for a buffered downlink transmission.

5. The method of claim 4 wherein the predetermined uplink frame is a null data frame.

6. The method of claim 3 further comprising:
   establishing scheduled wakeup times with the access point, which coincide with 802.11 Beacon transmissions;
   automatically receiving a buffered downlink frame from the access point following a scheduled wakeup time;
   suppressing successive predetermined uplink frames during periods of silence suppression when the access point indicates it does not have a buffered downlink frame;
   returning to the power save state until the occurrence of at least one of the group consisting of a next scheduled wakeup time and the 802.11 station has an uplink frame.

7. The method of claim 1 further comprising setting a flag by the 802.11 station in the uplink frame to indicate that the 802.11 station will stay in the operating state to send a successive uplink frames.

8. The method of claim 7 further comprising:
   receiving a poll from the access point to solicit an uplink transmission; and
   sending an uplink frame without first sensing a channel to determine if the channel is idle.

9. The method of claim 8 further comprising receiving a poll piggybacked onto a downlink data frame.

10. The method of claim 9 further comprising adding a data link acknowledgement for a downlink data frame to an uplink data frame.

11. The method of claim 9 further comprising receiving a data link acknowledgement piggybacked onto a downlink data frame.

12. An 802.11 station, comprising:
   means for switching to a power save state;
   means for switching to an operating state;
   means for transmitting an uplink frame to an access point;
   means for receiving an acknowledgement for the uplink frame from the access point where a flag in the acknowledgement indicates that the access point has one or more downlink frames buffered for the station;
   means for receiving a buffered downlink frame from the access point;
   means for returning to the power save state after a flag in the buffered downlink frame indicating the access point does not have another buffered downlink frame for the 802.11 station;

means for sensing when the channel is idle;

means for sending at least one uplink frame interleaved in a bidirectional burst of uplink and downlink data frames following the initial channel sense; and means for sending at least one successive uplink frame without sensing when the channel is idle;

wherein the power consumption in the power save state is less than the power consumption in the operating state.

13. The 802.11 station of claim 12 further comprising means for notifying an access point at the 802.11 station is operating in an automatic power save delivery mode.

14. The 802.11 station of claim 12 wherein the 802.11 station is a voice station and the uplink frame is a periodic voice packet transmission, the 802.11 station further comprising means for querying the access point for buffered downlink transmissions at a rate that corresponds to a packet rate for an interactive voice communications stream.

15. The 802.11 station of claim 14 further comprising sending means for sending a predetermined uplink frame during a period of silence suppression to query the access point for a buffered downlink transmission.

16. The 802.11 station of claim 15 wherein the predetermined uplink frame is a null data frame.

17. The 802.11 station of claim 14 further comprising:

means for establishing scheduled wakeup times with the access point, which coincide with 802.11 Beacon transmissions;

means for automatically receiving a buffered downlink frame from the access point following a scheduled wakeup time;

means for suppressing successive predetermined uplink frames during periods of silence suppression when the access point indicates it does not have a buffered downlink frame;

means for returning to the power save state until the occurrence of at least one of the group consisting of a next scheduled wakeup time and the 802.11 station has an uplink frame queued for transmission.

18. The 802.11 station of claim 12 further comprising means for setting a flag by the 802.11 station in the uplink frame to indicate that the 802.11 station will stay in the operating state to send a successive uplink frame.

19. The 802.11 station of claim 18 further comprising:

means for receiving a poll from the access point to solicit an uplink transmission; and means for sending an uplink frame without first sensing a channel to determine if the channel is idle.

20. The 802.11 station of claim 19 further comprising means for receiving a poll piggybacked onto a downlink data frame.

21. The 802.11 station of claim 20 further comprising means for adding a data link acknowledgement to an uplink frame.

22. The 802.11 station of claim 20 further comprising means for receiving a data link acknowledgement piggybacked onto a downlink frame.

23. A computer program product having a computer readable medium having computer program logic recorded thereon for operating an 802.11 wireless station, comprising:

means for switching the station to a power save state;

means for switching the station to an operating state;

means for transmitting an uplink frame to an access point;

means for receiving an acknowledgement for the uplink frame from the access point where a flag in the acknowledgement indicates that the access point has one or more downlink frames buffered for the station;

means for receiving a buffered downlink frame from the access point;

means for returning to the power save state after a flag in the buffered downlink frame indicating the access point does not have another buffered downlink frame for the 802.11 station;

means for sensing when the channel is idle;

means for sending at least one uplink frame interleaved in a bidirectional burst following the initial channel sense; and means for sending at least one successive uplink frame without sensing when the channel is idle;

wherein the power consumption in the power save state is less than the power consumption in the operating state.

24. The computer program product of claim 23 further comprising means for notifying an access point at the station is operating in an automatic power save delivery mode.

25. The computer program product of claim 23 wherein the station is a voice station and the uplink frame is a periodic voice packet transmission, the computer program product further comprising means for querying the access point for buffered downlink transmissions at a rate that corresponds to a packet rate for an interactive voice communications stream.

26. The computer program product of claim 25 further comprising sending means for sending a predetermined uplink frame during a period of silence suppression to query the access point for a buffered downlink transmission.

27. The computer program product of claim 26 wherein the predetermined uplink frame is a null data frame.

28. The computer program product of claim 25 further comprising:

means for establishing scheduled wakeup times with the access point, which coincide with 802.11 Beacon transmissions;

means for automatically receiving a buffered downlink frame from the access point following a scheduled wakeup time;

means for suppressing successive predetermined uplink frames during periods of silence suppression when the access point indicates it does not have a buffered downlink frame;

means for returning to the power save state until the occurrence of at least one of the group consisting of a next scheduled wakeup time and the station has an uplink frame.

29. The computer program product of claim 23 further comprising means for setting a flag by in the uplink frame to indicate that the station will stay in the operating state to send a successive uplink frame.

30. The computer program product of claim 29 further comprising:

means for receiving a poll from the access point to solicit an uplink transmission; and means for sending an uplink frame without first sensing a channel to determine if the channel is idle.

31. The computer program product of claim 30 further comprising means for receiving a poll piggybacked onto a downlink data frame.

32. The computer program product of claim 31 further comprising means for adding a data link acknowledgement to an uplink.

33. The computer program product of claim 31 further comprising means for receiving a data link acknowledgement appended to a downlink frame.

34. The computer program product of claim 23 further comprising means for sensing when the channel is idle;
means for sending at least one uplink frame interleaved in a bidirectional burst following the initial channel sense; and
means for sending at least one successive uplink frame without sensing when the channel is idle.

35. A method for an access point to communicate with a wireless station, the steps comprising:
receiving a notification from the station that the station is in an automatic power save delivery mode;
buffering a downlink frame while the station is in a power save state;
automatically sending a downlink frame to the station when the station is in the wakeup state;
negotiating a periodic wakeup schedule with the station, the schedule comprises a scheduled start time and a wakeup period, the wakeup period is defined as the time between each scheduled wakeup time and corresponds to a packet rate for an interactive voice communications session;
synchronizing wakeup times with the 802.11 Timer Synchronization Function;
sending a poll at the start of each scheduled wakeup time, the poll comprising a poll frame, the poll frame comprising a flag indicating if the access point has a downlink frame buffered for the station; and
sending a downlink frame containing a channel reservation for a channel, the channel reservation selected from the group consisting of an implicit channel reservation and an explicit channel reservation, wherein the channel reservation inhibits transmission from other stations.

36. The method of claim 35 wherein the poll is piggybacked on the downlink data frame.

37. The method of claim 35 wherein a data link acknowledgement is piggybacked onto the downlink frame.

38. The method of claim 35 further comprising:
sensing the channel before sending the poll,
sending at least one downlink frame interleaved in a bidirectional burst of downlink and uplink frames, wherein the channel is only sensed before the initial poll.

39. The method of claim 38 further comprising sending a successive downlink frame without sensing the channel.

40. The method of claim 35 wherein the station is a power save voice station, the method further comprising:
receiving a message from the station at the start of an interactive voice session;
negotiating a fast wakeup schedule with the station; and
receiving a message from the station terminating the fast wakeup schedule at the end of the interactive voice session.

41. The method of claim 35 further comprising:
determining wakeup schedule start times and wakeup periods; and
selecting non-overlapping wakeup times and wakeup periods.

42. The method of claim 35 further comprising:
determining an Internet Protocol address for the station;
providing a proxy Address Resolution Protocol service for the station so that the station does not need to receive broadcast Address Resolution Protocol Request messages; and
indicating to the station that the proxy Address Resolution Protocol service is being provided.

43. The method of claim 42 further comprising the registering the Internet Protocol address for the station with the access point.

44. The method of claim 42 further comprising:
snooping packets by the access point received from the station and learning the Internet Protocol address of the station; and
storing the Internet Protocol address by the access point.

45. The method of claim 44 further comprising sending the Internet Protocol address to a second access point over the network infrastructure when the station roams to the second access point.

46. An access point, comprising:
means for receiving a notification from the station that the station is in an automatic power save delivery mode;
means for buffering a downlink frame while the station is in a power save state;
means for automatically sending a downlink frame to the station when the station is in the wakeup state;
means for negotiating a periodic wakeup schedule with the station, the schedule comprises a scheduled start time and a wakeup period, the wakeup period is defined as the time between each scheduled wakeup time and corresponds to a packet rate for an interactive voice communications session;
means for synchronizing wakeup times with the 802.11 Timer Synchronization Function;
means for sending a poll at the start of each scheduled wakeup time, the poll comprising a poll frame, the poll frame comprising a flag indicating if the access point has a downlink frame buffered for the station;
means for determining an Internet Protocol address for the station;
means for providing a proxy Address Resolution Protocol service for the station so that the station does not need to receive broadcast Address Resolution Protocol Request messages; and
means for indicating to client stations that the proxy Address Resolution Protocol service is being provided.

47. The access point of claim 46 further comprising means for sending a downlink frame containing a channel reservation for a channel, the channel reservation selected from the group consisting of an implicit channel reservation and an explicit channel reservation, wherein the channel reservation inhibits transmissions from other stations.

48. The access point of claim 46 further comprising:
means for sensing the channel before sending the poll,
means for sending at least one downlink frame interleaved in a bidirectional burst of downlink and uplink frames, wherein the channel is only sensed before the initial poll.

49. The access point of claim 48 further comprising means for sending a successive downlink frame without sensing the channel.

50. The access point of claim 46, further comprising:
means for snooping packets by the access point received from the station and learning the Internet Protocol address of the station;
means for storing the Internet Protocol address by the access point.

51. The access point of claim 50 further comprising means for sending the Internet Protocol address to a second access point over the network infrastructure when the station roams to the second access point.

52. A method of operating in an automatic power save delivery mode by a wireless station, the steps comprising:
receiving a notification from a power save 802.11 station that the station is operating in an automatic power save delivery mode,
negotiating a periodic wakeup schedule between the station and an access point, the schedule comprises a scheduled start time and a wakeup period, the wakeup period is defined as the time between each scheduled wakeup time and corresponds to a packet rate for an interactive voice communications session;

synchronizing wakeup times with the 802.11 Timer Synchronization Function;

waiting for a poll from the access point at the start of each scheduled wakeup time, the poll comprising a poll frame, the poll frame comprising a flag indicating if the access point has a downlink frame buffered for the station; and setting a flag in an uplink frame sent by the station to the access point to indicate the station will stay in the awake state to send at least one successive uplink frame to the access point, the uplink frame sent in response to the poll.

53. The method of claim 52 further comprising receiving a downlink frame containing a channel reservation for a channel, the channel reservation selected from the group consisting of an implicit channel reservation and an explicit channel reservation, wherein the channel reservation inhibits transmissions from other stations.

54. The method of claim 52 further comprising the station sending a frame in response to the poll by the sent by the access point without first sensing the channel to determine if the channel is idle.

55. The method of claim 52 wherein the station stays in an awake state following each scheduled wakeup time until receiving a frame with a flag set to indicate that the access point does not have a downlink frame buffered for the station.

56. The method of claim 52 wherein the station is a voice station.

57. The method of claim 52 wherein a data link acknowledgement is piggybacked onto the uplink frame.

58. The method of claim 52 further comprising:
receiving the poll; and
sending an uplink frame interleaved in a bidirectional burst, wherein the frame is sent after the poll and the channel is only sensed before the initial poll.

59. The method of claim 52 wherein the station is a power save voice station, the method further comprising:
sending a message to the access point to negotiate a fast wakeup schedule at the start of an interactive voice session; and
sending a message to the access point to terminate the fast wakeup schedule at the end of the interactive voice session.

60. The method of claim 52 wherein the station has a voice sampling rate that is faster than a wakeup period, the method further comprising:
immediately queuing voice samples for transmission;
coalescing any available voice samples into a data communications packet before a scheduled wakeup time; and
sending the data communications packet after the scheduled wakeup time.

61. The method of claim 52 further comprising registering an Internet Protocol address for the station with the access point.

62. The method of claim 61 further comprising registering the Internet Protocol address of the station with a second access point whenever the station reassociates with the second access point.

63. A computer program product having a computer readable medium having computer program logic recorded thereon for performing method of operating in an automatic power save delivery mode by a wireless station, the steps comprising:

means for receiving a notification from a power save 802.11 station that the station is operating in an automatic power save delivery mode, means for negotiating a periodic wakeup schedule between the station and an access point, the schedule comprises a scheduled start time and a wakeup period, the wakeup period is defined as the time between each scheduled wakeup time and corresponds to a packet rate for an interactive voice communications session;

means for synchronizing wakeup times with the 802.11 Timer Synchronization Function;

means for waiting for a poll from the access point at the start of each scheduled wakeup time, the poll comprising a poll frame, the poll frame comprising a flag indicating if the access point has a downlink frame buffered for the station; and means for receiving a downlink frame containing a channel reservation for a channel, the channel reservation selected from the group consisting of an implicit channel reservation and an explicit channel reservation, wherein the channel reservation inhibits transmissions from other stations.

64. The computer program product of claim 63 further comprising means for receiving a downlink frame containing a channel reservation for a channel, the channel reservation selected from the group consisting of an implicit channel reservation and an explicit channel reservation, wherein the channel reservation inhibits transmissions from other stations.

65. The computer program product of claim 63 further comprising means for the station sending a frame in response to the poll sent by the access point without first sensing the channel to determine if the channel is idle.

66. The computer program product of claim 63 wherein the station stays in an awake state following each scheduled wakeup time until receiving a frame with a flag set to indicate that the access point does not have a downlink frame buffered for the station.

67. The computer program product of claim 63 further comprising means for setting a flag in an uplink frame sent by the station to the access point to indicate the station will stay in the awake state to send at least one successive uplink frame to the access point, the uplink frame sent in response to the poll.

68. The computer program product of claim 63 further comprising:
means for receiving the poll; and
means for sending an uplink frame interleaved in a bidirectional burst of uplink and downlink data frames, wherein the frame is sent after the poll and the channel is only sensed before the initial poll.

69. The computer program product of claim 63 wherein the station is a power save voice station, the method further comprising:
means for sending a message to the access point to negotiate a fast wakeup schedule at the start of an interactive voice session; and
means for sending a message to the access point to terminate the fast wakeup schedule at the end of the interactive voice session.

70. The computer program product of claim 63 wherein the station has a voice sampling rate that is faster than a wakeup period, the method further comprising:
means for immediately queuing voice samples for transmission;

means for coalescing any available voice samples into a data communications packet before a scheduled wakeup time; and means for sending the data communications packet after the scheduled wakeup time.

71. The computer program product of claim 63 further comprising means for registering an Internet Protocol address for the station with the access point.

72. The computer program product of claim 63 further comprising registering the Internet Protocol address of the station with a second access point whenever the station reassociates with the second access point.

73. A method, the steps comprising:
notifying an access point by a power save 802.11 station that the station is operating in an automatic power save delivery mode,
automatically sending a downlink frame to the station when the access point determines the station is in an awake state;
buffering a downlink frame by the access point when the access point determines the station is in a power save state;
negotiating a periodic wakeup schedule between the station and an access point, the schedule comprises a scheduled start time and a wakeup period, the wakeup period is defined as the time between each scheduled wakeup time and corresponds to a packet rate for an interactive voice communications session;
synchronizing wakeup times with the 802.11 Timer Synchronization Function;
sending a poll by the access point at the start of each scheduled wakeup time, the poll comprising a poll frame, the poll frame comprising a flag indicating if the access point has a downlink frame buffered for the station;
immediately queuing voice samples for transmission; and
coalescing any available voice samples into a data communications packet before a scheduled wakeup time;
wherein the station has a voice sampling rate that is faster than a wakeup period.

74. A method for an access point to communicate with a wireless station, the steps comprising:
receiving a notification from the station that the station is in an automatic power save delivery mode;
buffering a downlink frame while the station is in a power save state;
automatically sending a downlink frame to the station when the station is in the wakeup state;
negotiating a periodic wakeup schedule with the station, the schedule comprises a scheduled start time and a wakeup period, the wakeup period is defined as the time between each scheduled wakeup time and corresponds to a packet rate for an interactive voice communications session;
synchronizing wakeup times with the 802.11 Timer Synchronization Function;
sending a poll at the start of each scheduled wakeup time, the poll comprising a poll frame, the poll frame comprising a flag indicating if the access point has a downlink frame buffered for the station;
determining an Internet Protocol address for the station;
providing a proxy Address Resolution Protocol service for the station so that the station does not need to receive broadcast Address Resolution Protocol Request messages; and
indicating to the station that the proxy Address Resolution Protocol service is being provided.

75. The method of claim 74, further comprising the registering the Internet Protocol address for the station with the access point.

76. The method of claim 74, further comprising:
snooping packets by the access point received from the station and learning the Internet Protocol address of the station; and
storing the Internet Protocol address by the access point.

77. The method of claim 76, further comprising sending the Internet Protocol address to a second access point over the network infrastructure when the station roams to the second access point.

78. A method of operating in an automatic power save delivery mode by a wireless station, the steps comprising:
receiving a notification from a power save 802.11 station that the station is operating in an automatic power save delivery mode,
negotiating a periodic wakeup schedule between the station and an access point, the schedule comprises a scheduled start time and a wakeup period, the wakeup period is defined as the time between each scheduled wakeup time and corresponds to a packet rate for an interactive voice communications session;
synchronizing wakeup times with the 802.11 Timer Synchronization Function;
waiting for a poll from the access point at the start of each scheduled wakeup time, the poll comprising a poll frame, the poll frame comprising a flag indicating if the access point has a downlink frame buffered for the station;
receiving the poll; and
sending an uplink frame interleaved in a bidirectional burst, wherein the frame is sent after the poll and the channel is only sensed before the initial poll.

79. The method of claim 78, wherein the station is a power save voice station, the method further comprising:
sending a message to the access point to negotiate a fast wakeup schedule at the start of an interactive voice session; and
sending a message to the access point to terminate the fast wakeup schedule at the end of the interactive voice session.

80. A method of operating in an automatic power save delivery mode by a wireless station, the steps comprising:
receiving a notification from a power save 802.11 station that the station is operating in an automatic power save delivery mode,
negotiating a periodic wakeup schedule between the station and an access point, the schedule comprises a scheduled start time and a wakeup period, the wakeup period is defined as the time between each scheduled wakeup time and corresponds to a packet rate for an interactive voice communications session;
synchronizing wakeup times with the 802.11 Timer Synchronization Function;
waiting for a poll from the access point at the start of each scheduled wakeup time, the poll comprising a poll frame, the poll frame comprising a flag indicating if the access point has a downlink frame buffered for the station;
immediately queuing voice samples for transmission;
coalescing any available voice samples into a data communications packet before a scheduled wakeup time; and
sending the data communications packet after the scheduled wakeup time;
wherein the station has a voice sampling rate that is faster than a wakeup period.

81. A method of operating in an automatic power save delivery mode by a wireless station, the steps comprising:
- receiving a notification from a power save 802.11 station that the station is operating in an automatic power save delivery mode,
- negotiating a periodic wakeup schedule between the station and an access point, the schedule comprises a scheduled start time and a wakeup period, the wakeup period is defined as the time between each scheduled wakeup time and corresponds to a packet rate for an interactive voice communications session;
- synchronizing wakeup times with the 802.11 Timer Synchronization Function;
- waiting for a poll from the access point at the start of each scheduled wakeup time, the poll comprising a poll frame, the poll frame comprising a flag indicating if the access point has a downlink frame buffered for the station; and
- registering an Internet Protocol address for the station with the access point.

82. The method of claim 81, further comprising registering the Internet Protocol address of the station with a second access point whenever the station reassociates with the second access point.

83. A computer program product having a computer readable medium having computer program logic recorded thereon for performing method of operating in an automatic power save delivery mode by a wireless station, the steps comprising:
- means for receiving a notification from a power save 802.11 station that the station is operating in an automatic power save delivery mode,
- means for negotiating a periodic wakeup schedule between the station and an access point, the schedule comprises a scheduled start time and a wakeup period, the wakeup period is defined as the time between each scheduled wakeup time and corresponds to a packet rate for an interactive voice communications session;
- means for synchronizing wakeup times with the 802.11 Timer Synchronization Function;
- means for waiting for a poll from the access point at the start of each scheduled wakeup time, the poll comprising a poll frame, the poll frame comprising a flag indicating if the access point has a downlink frame buffered for the station; and
- means for the station sending a frame in response to the poll sent by the access point without first sensing the channel to determine if the channel is idle.

84. A computer program product having a computer readable medium having computer program logic recorded thereon for performing method of operating in an automatic power save delivery mode by a wireless station, the steps comprising:
- means for receiving a notification from a power save 802.11 station that the station is operating in an automatic power save delivery mode,
- means for negotiating a periodic wakeup schedule between the station and an access point, the schedule comprises a scheduled start time and a wakeup period, the wakeup period is defined as the time between each scheduled wakeup time and corresponds to a packet rate for an interactive voice communications session;
- means for synchronizing wakeup times with the 802.11 Timer Synchronization Function;
- means for waiting for a poll from the access point at the start of each scheduled wakeup time, the poll comprising a poll frame, the poll frame comprising a flag indicating if the access point has a downlink frame buffered for the station;
- means for receiving the poll; and
- means for sending an uplink frame interleaved in a bidirectional burst of uplink and downlink data frames, wherein the frame is sent after the poll and the channel is only sensed before the initial poll.

85. A computer program product having a computer readable medium having computer program logic recorded thereon for performing method of operating in an automatic power save delivery mode by a wireless station, the steps comprising:
- means for receiving a notification from a power save 802.11 station that the station is operating in an automatic power save delivery mode,
- means for negotiating a periodic wakeup schedule between the station and an access point, the schedule comprises a scheduled start time and a wakeup period, the wakeup period is defined as the time between each scheduled wakeup time and corresponds to a packet rate for an interactive voice communications session;
- means for synchronizing wakeup times with the 802.11 Timer Synchronization Function;
- means for waiting for a poll from the access point at the start of each scheduled wakeup time, the poll comprising a poll frame, the poll frame comprising a flag indicating if the access point has a downlink frame buffered for the station;
- means for immediately queuing voice samples for transmission;
- means for coalescing any available voice samples into a data communications packet before a scheduled wakeup time; and
- means for sending the data communications packet after the scheduled wakeup time;
- wherein the station has a voice sampling rate that is faster than a wakeup period.

86. A computer program product having a computer readable medium having computer program logic recorded thereon for performing method of operating in an automatic power save delivery mode by a wireless station, the steps comprising:
- means for receiving a notification from a power save 802.11 station that the station is operating in an automatic power save delivery mode,
- means for negotiating a periodic wakeup schedule between the station and an access point, the schedule comprises a scheduled start time and a wakeup period, the wakeup period is defined as the time between each scheduled wakeup time and corresponds to a packet rate for an interactive voice communications session;
- means for synchronizing wakeup times with the 802.11 Timer Synchronization Function;
- means for waiting for a poll from the access point at the start of each scheduled wakeup time, the poll comprising a poll frame, the poll frame comprising a flag indicating if the access point has a downlink frame buffered for the station; and
- means for registering an Internet Protocol address for the station with the access point.

\* \* \* \* \*